Nov. 28, 1939.    M. C. SNYDER    2,181,772
SPARE FUEL TANK FOR TRUCKS
Filed April 17, 1939
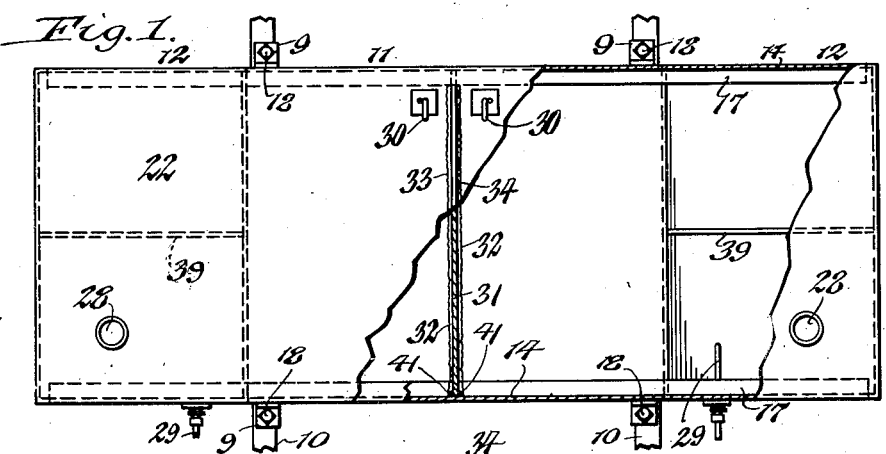

Patented Nov. 28, 1939

2,181,772

UNITED STATES PATENT OFFICE 2,181,772

SPARE FUEL TANK FOR TRUCKS

Mahlon C. Snyder, Blasdell, N. Y.

Application April 17, 1939, Serial No. 268,205

5 Claims. (Cl. 220—20)

This invention relates to a tank which is more particularly intended for carrying a spare supply of fuel such as gasolene on a truck for operating the same when the regular supply of liquid fuel is exhausted.

Inasmuch as the gasolene storage tanks of trucks are usually of such size that the amount of gasolene which is capable of being carried therein will only operate the truck a comparatively short distance before replenishing of the gasolene supply becomes necessary, it has become the practice for trucks which operate over long distances to carry an extra supply of gasolene in containers which are not a regular equipment of a truck and these spare containers were therefore usually mounted on the truck in a manner which was not secure and rendered it possible for the gasolene container when subjected to an unusual jar, such as might occur during a collision or skid, to displace the container and spill its contents, thereby endangering the safety of life and property due to the liability of the gasolene catching fire.

The possibility of upsetting the gasolene containers and spilling their contents has been overcome by constructing the same in the form of a saddle having an upper part which extends over the frame of a truck and two side parts which depend from opposite ends of the upper part so that this gasolene fuel container straddles the truck frame and is incapable of being tipped over and thus avoids spilling its contents. Tanks of this character, however, as heretofore constructed have been found very weak and liable to be injured and spring leaks so that the fire hazard was still present to an undue extent.

It is the object of this invention to provide a spare fuel tank for trucks which is of the saddle type adapted to be mounted on the truck frame so as to straddle the same and thereby reduce the liability of tipping the tank and which is further so constructed that some of its walls not only serve as part of the enclosure of the tank but also serve as means for reenforcing the tank so that it is strong and not liable to be damaged while mounted on the truck and carrying a load of gasolene and at the same time obtaining these advantages without any appreciable increase in cost of construction as well as eliminating the liability for repairs.

In the accompanying drawing:

Fig. 1 is a top plan view of a spare fuel tank, partly in section, embodying one form of this invention and mounted on a part of the main frame of a truck.

Fig. 2 is a vertical transverse section of the same, partly in elevation.

Figs. 3 and 4 are fragmentary vertical longitudinal sections, on an enlarged scale, taken on the correspondingly numbered lines in Fig. 2.

Fig. 5 is a fragmentary vertical transverse section of a spare fuel tank for trucks showing a modified construction of this invention.

In the following description similar characters of reference indicate like parts in the several figures of the drawing:

Referring to Figs. 1 and 2, the numeral 10 represents the two longitudinal side bars or beams of a truck or automobile frame or chassis which may be of any suitable and well known construction. The spare fuel tank which embodies the present improvements consists generally of an upper section which has a central part 11 arranged over the truck frame and two end parts 12, 12 which project laterally from the central part 11 beyond the opposite sides of the truck frame, and two side sections 13, 13 which extend downwardly from the undersides of the end portions of the upper section and are arranged along the opposite outer sides of the truck frame.

The upper tank section includes two parallel girders which are spaced apart lengthwise of the truck frame and each of which has a central part 14 which is supported on top of the frame bars 10 and extends across the space between the latter, and two end parts 15 which extend laterally beyond outer sides of the frame bars 10 and have their upper outer corners preferably rounded, as shown at 16. Each of these girders is preferably of U-shape or channel shape in cross section and has its web arranged vertically and its flanges 17 projecting horizontally inwardly. These girders are made of comparatively heavy metal, such as iron or steel, so that they serve not only as the transverse walls of the upper section of the fuel tank but also as reenforcements of this section of the tank, and also as a strong and reliable support for the side sections of the tank which are suspended from opposite ends of these girders. Various means may be employed for securing this spare fuel tank to the truck frame but this is preferably accomplished by means of attaching brackets 9 which are secured to the outer sides to the girders by electric welding or otherwise and connected with the adjacent parts of the frame bars 10 by means of bolts 18, as shown in Figs. 1 and 2.

Each of the side sections of the spare fuel tank is provided with two upright transverse walls 19 which are made of comparatively thin metal, such as sheet iron or steel, the inner edges of these side walls being arranged adjacent to the outer sides of the frame bars 10 and the upper horizontal edges thereof being connected by means of welding 20 with the undersides of the respective ends of the two girders, as best shown in Fig. 4.

The numeral 21 represents the outer longitudinal walls of the side tanks and 22 the top wall portions of the upper tank section on opposite sides of the central part thereof. Each of the longitudinal walls 21 of one of the side tank sections and the top wall portion 22 of the adjacent end of the upper tank section are preferably constructed in one piece from sheet metal, such as steel or iron, which sheet extends from the lower ends of the respective transverse walls 19 upwardly along the outer vertical edges of these walls, thence inwardly and over the curved corners 16 of the respective ends of the girders, and thence horizontally inward over the upper sides or edges of the adjacent parts of the girders, and terminating at its inner end short of the opposing inner end of the other sheet of metal forming the outer longitudinal wall of the companion side section and the top wall of the opposite end of the upper tank section. The connection between each of the outer plates 21, 22 of each side section and the adjacent outer vertical edges of the transverse plates 19 and the top of the girders is effected by means of welding or in any other approved manner so as to produce liquid tight joints between these members.

The numeral 23 represents horizontal bottom plates which form the lower walls of the side tank sections and each of which has its outer longitudinal edge connected by welding 24 with the lower longitudinal edge of the adjacent longitudinal wall 21 of the respective side section of the tank while its transverse edges are similarly connected with the lower transverse edges of the transverse walls 19 of said tank section, as best shown at 25, in Fig. 4. The numeral 26 represents two upright longitudinal plates which form the inner walls of the side sections and each of which is connected at its lower longitudinal edge with the inner longitudinal edge of the plate 23 forming the bottom of the respective side tank section while the vertical edges of this inner wall 26 are connected with the inner vertical edges of the transverse walls 19 of the side tank sections. Between the two side tank sections is arranged a sheet metal plate 27 which forms the bottom of the central part 11 of the upper tank section and has its horizontal transverse edges secured to the underside of the adjacent parts of the two girders while its opposite longitudinal edges are connected with the upper longitudinal edges of the plates 26 forming the inner walls of the side tank sections.

In the preferred construction, the plates 23 forming the bottom walls of the two side tank sections, the upright plates 26 forming the longitudinal inner walls of these side wall sections, and the plate 27 forming the lower wall or bottom of the central part of the upper tank section are all constructed from a single or continuous sheet of suitable metal, such as steel or iron and the connection between these walls and the transverse walls 19 of the side tank sections and the girders of the upper tank section is preferably effected by means of electric welding although this may be accomplished otherwise if desired.

By thus constructing the upper tank section partly of girders which are heavy, strong, and durable the same not only form a reenforcement for the tank as a whole but also serve as the transverse walls of the upper tank section and thereby effect an economy in the use of metal and a corresponding reduction in cost. In addition to this these girders form a very strong and durable support for carrying the side sections of the tank which are suspended therefrom and thereby serve as a protection against damage to these side tank sections which is very desirable due to the exposed position of these last mentioned sections.

Filling of this tank may be effected through filling tubes 28 arranged at opposite ends of the upper section and communicating with the interior thereof, and the fluid may be withdrawn from this tank through delivery pipes 29, each of which extends through one of the transverse walls of a side tank section and has its inner part extending close to the bottom of the respective tank section while its upper part leads to the place where the gasolene is to be consumed.

Venting of the interior of the tank so as to permit air to escape therefrom while the tank is being filled and also to permit air to enter the tank when the gasolene level therein is lowered may be effected in various ways, for instance by means of coil shaped vent pipes 30 mounted on the top wall of the upper tank section and placing the outer atmosphere in communication with the interior of the tank on opposite sides of the central part of the same, as shown in Figs. 1 and 2.

According to some of the laws which govern the transportation of gasolene or other combustible liquids, a limit is set as to the amount of such liquid which can be carried in any one container so that in case the container should be damaged due to a collision or other accident and the combustible liquid is released, the fire which might result from such an accident could be more easily controlled.

Inasmuch, therefore, as the total capacity of the upper and side sections of the present tank exceeds the limit now set by some laws, means have been provided whereby the internal space within this tank is divided into two compartments, each of which has a capacity less than that permitted by the present laws.

The construction shown in Figs. 1, 2 and 3 for accomplishing this purpose consists of an upright longitudinal sheet metal partition 31 which extends lengthwise across the central part of the upper section of the tank and is secured at its lower edge to the bottom 27 of this part of the tank by means of electric welding 32 while the upper edge portion 33 of this partition extends upwardly through the slot formed between the opposing inner ends of the two top wall plates 22 of the central tank section and is connected therewith by means of welding 34 and the opposite vertical edges of this partition are connected with the inner sides of the adjacent central parts of the girders by welding 41.

By this means the tank as a whole is divided into two separate and distinct compartments, each of which includes one of the side sections and one-half of the upper section and as each of these compartments is provided with an individual filling neck 28, discharge pipe 29 and vent pipe 30, it is possible to introduce gasolene into the same and withdraw the contents therefrom independently of the other compartment. In the event that one of these compartments should be injured and permit the escape of gasolene the fire hazard would be limited by the amount of gasolene escaping from this particular compartment and it would also be possible to continue the use of the other compartment until repairs of the injured part of the tank can be effected.

If desired two separate upright longitudinal partitions or walls 35 of sheet metal may be utilized for dividing the tank or container into two compartments. In such a modified construction, as shown in Fig. 5, these two partition walls 35 are spaced apart transversely of the tank so as to form a clear space or pocket 44 between the same and each of these partition walls is secured by electric welding 36 or otherwise at its lower longitudinal edge to the adjacent part of the bottom wall 27 of the upper tank section, its upper longitudinal edge is connected by electric welding 37 with the adjacent inner longitudinal edge of the respective top wall section 22 and the opposite vertical edges of this partition are connected to the adjacent inner sides of the two girders in the same manner in which the partition 31 is secured to these girders.

In order to permit of conveniently removing any dirt which may accumulate in the clearance space or pocket 44, the adjacent bottom wall 27 of the upper tank section may be provided with a discharge opening 38 so as to permit of sweeping dirt downwardly through the same, or this bottom wall 27 may be omitted altogether between the two inner walls or partitions 35 so that dirt will be prevented from lodging in this pocket. It is preferable, however, to retain a substantial amount of the bottom 27 across the space between the lower ends of the partitions 35 inasmuch as this not only strengthens the tank as a whole, but also forms a convenient place for storing tools and other equipment such as those used in taking care of a truck.

For the purpose of preventing the gasolene stored in the tank from surging or splashing unduly while the truck is in motion, each of the side sections of the two compartments is provided with an upright transverse baffle 39 of sheet metal which is secured at its lower horizontal and vertical inner and outer edges to the bottom and the inner and outer walls of this side section, the upper end of this baffle terminating short of the upper end of the respective side section and the inner and outer lower corners of this baffle being cut away so as to form passages 40 by which communication is established between the lower ends of the spaces in each compartment on opposite sides of the baffle so as to maintain a uniform level therein.

I claim as my invention:

1. A spare fuel tank for trucks comprising an upper section having a central part adapted to be arranged above the frame of the truck and end parts arranged at opposite ends of said central part and extending beyond the opposite sides of said frame, and two side sections arranged below the end parts of said upper section, said upper section having its opposite transverse walls constructed of channel shaped girders, and the opposite transverse walls of each of said side sections being constructed of plates which are connected at their upper ends with the underside of the respective ends of said girders on one side of said frame.

2. A spare fuel tank for trucks comprising an upper section having a central part adapted to be arranged above the frame of the truck and end parts arranged at opposite ends of said central part and extending beyond the opposite sides of said frame, and two side sections arranged below the end parts of said upper section, said upper section having its opposite transverse walls constructed of channel shaped girders, and the opposite transverse walls of each of said side sections being constructed of plates which are connected at their upper ends with the underside of the respective ends of said girders on one side of said frame and the outer longitudinal wall of each side section and the top of the adjacent part of said upper section being constructed of a continuous sheet of metal secured to the transverse walls of the respective side section and upper side of the respective end portions of said girders.

3. A spare fuel tank for trucks comprising an upper section having a central part adapted to be arranged above the frame of the truck and end parts arranged at opposite ends of said central part and extending beyond the opposite sides of said frame, and two side sections arranged below the end parts of said upper section, said upper section having its opposite transverse walls constructed of channel shaped girders, and the opposite transverse walls of each of said side sections being constructed of plates which are connected at their upper ends with the underside of the respective ends of said girders on one side of said frame and the bottom of said side sections, the inner longitudinal walls of the same and the underside of the central part of said upper section between said sections being constructed from a continuous sheet of metal.

4. A spare fuel tank for trucks comprising an upper section having a central part adapted to be arranged above the frame of the truck and end parts arranged at opposite ends of said central part and extending beyond the opposite sides of said frame, and two side sections arranged below the end parts of said upper section, said upper section having its opposite transverse walls constructed of channel shaped girders, and the underside of said upper section between the side sections being constructed of sheet metal secured to the underside of the respective parts of said girders, the upper wall of said upper section consisting of sheet metal plates secured to the upper sides of said girders and having their inner ends opposed and spaced apart, and an upright partition extending lengthwise of the central part of said upper section and secured at its lower edge to the central bottom of said upper section and having its ends connected with said girders and its upper part extending upwardly between the inner ends of said upper wall plates and secured thereto.

5. A spare fuel tank for trucks comprising an upper section having a central part adapted to be arranged above the frame of the truck and end parts arranged at opposite ends of said central part and extending beyond the opposite sides of said frame, and two side sections arranged below the end parts of said upper section, said upper section having its opposite transverse walls constructed of channel shaped girders, and the underside of said upper section between the side sections being constructed of sheet metal secured to the underside of the respective parts of said girders, the upper wall of said upper section consisting of sheet metal plates secured to the upper sides of said girders and having their inner ends opposed and spaced apart, and two upright longitudinal partitions which are spaced apart transversely and extend lengthwise of the central part of said upper section and each of which is secured at its lower edge to the central bottom of said upper section and has its ends connected with said girders and its upper part connected with the inner end of one of the upper wall plates of said upper section.

MAHLON C. SNYDER.